United States Patent [19]

Tilman

[11] 4,354,541

[45] Oct. 19, 1982

[54] PROFILED PLASTICS BAG CLOSURE STRIP AND ADHESIVE BONDING METHOD

[75] Inventor: Paul A. Tilman, Canvey Island, England

[73] Assignee: Minigrip, Inc., Orangeburg, N.Y.

[21] Appl. No.: 173,471

[22] Filed: Jul. 30, 1980

[30] Foreign Application Priority Data

Sep. 13, 1979 [GB] United Kingdom ................. 7927390

[51] Int. Cl.³ ............................................. B65D 33/24
[52] U.S. Cl. ................................... 150/3; 24/201 C;
156/66; 156/291; 428/100
[58] Field of Search .................... 150/3; 24/201 C;
156/66, 290, 291, 292; 428/99, 100, 198, 195,
167, 156

[56] References Cited

U.S. PATENT DOCUMENTS 2,681,716  6/1954  Black ........................ 24/201 C UX
3,761,336  9/1973  Quinif ............................. 156/292 X
4,154,880  5/1979  Drennan ............................... 428/38
4,250,596  2/1981  Hara et al. ....................... 156/66 X

FOREIGN PATENT DOCUMENTS 1546433  5/1979  United Kingdom .

Primary Examiner—Donald F. Norton
Attorney, Agent, or Firm—Hill, Van Santen, Steadman, Chiara & Simpson

[57] ABSTRACT

A closure strip (1) which incorporates a profiled closure element for use in resealable or reclosable bags is provided with a channel (4) in its surface which contacts a bag forming substrate material (6) for receiving adhesive (5). The presence of the channel ensures that a suitable thickness of adhesive is present at the time of bonding of the closure strip to the substrate. The invention also provides a method of making bag forming material by use of such a closure strip.

15 Claims, 8 Drawing Figures

PROFILED PLASTICS BAG CLOSURE STRIP AND ADHESIVE BONDING METHOD

BACKGROUND OF THE INVENTION

This invention relates to a profiled plastics closure strip and an adhesive bonding method.

Releasable bags of plastics material are well-known. These bags include a bag forming substrate and closure strips along the mouth of the bag. Each closure strip has one of a cooperating pair of male and female profiled closure elements. The principal method of making such material has been to extrude a tube which includes the substrate and integral closure strips and then to flatten the tube and to cut and weld in various directions so as to form the individual bags. In more recent times there have been developments directed towards the use of an adhesive for bonding independently extruded closure strips to a substrate. G.B. Pat. No. 1546433 describes a general method for the adhesive bonding of a closure strip to a substrate In the adhesive bonding method a relatively thick closure strip is bonded to a relatively thin substrate and where a hot melt type of adhsive is used a substantial quantity of heat is required in order to ensure that proper adhesion of the closure strip to the substrate is obtained. In technical terms it is necessary to ensure that there is sufficient heat to "wet out" the closure strip or at least that portion thereof which is subject to contact with the adhesive to form the bond.

In practice it has been found to be difficult to achieve a satisfactory bond between two thermo-plastic components such as a substrate and a closure strip. It is believed that this difficulty arises at least in part from one or more of the variables within the bonding method and the products and apparatus concerned. The adhesive applicator system tends to provide a varying output of bonding material. The speed with which the thermo-plastic components pass the adhesive applicator system varies. These two factors lead to a variation in the mass of adhesive per length of the substrate and closure strip. There can be variations in the pressures applied to the substrate and closure strip during bonding. There can be variations in the thickness of the profile structure due to variations inherent in an extrusion process. These two factors can result in a greater or lesser quantity of adhesive being squeezed out from between the two components or even in the two components failing to make adhering contact.

The present invention is predicated on the realisation that an important part of an adhesive bonding method concerning the components in question is to provide a given thickness of the adhesive material over at least a part of the contacting surfaces of the strip and the substrate. This thickness ensures, when a hot melt type of adhesive is used, that there is a suitable quantity of heat per unit area of the closure strip to ensure that "wet out" of the strip is obtained at least over that part of its surface area designed to make adhering contact with the substrate.

SUMMARY OF THE INVENTION

In one aspect of the present invention, there is provided in a closure strip of plastics material for use in the manufacture of a resealable bag and having a longitudinally extending profiled closure element upstanding with respect to one face of a ribbon-like base element and having an opposite face surface adapted to be adhesively attached to bag material, the improvement in which said opposite face surface of the ribbon-like base element includes adhesive-confining narrow spacer rib means along opposite longitudinal edges and projecting from said surface a distance about the same as the thickness of a layer of adhesive for securing the closure strip to a substrate of said bag material, there being an adhesive layer-receiving wide channel area of said surface several times as wide as said rib means and intervening between said rib means; said rib means being adapted to maintain said area spaced an adhesive layer thickness distance from the substrate when pressure is applied for pressing the strip and substrate together.

In addition, in accordance with a further aspect of the invention, there is provided a method of manufacturing material for making resealable bags comprising feeding adhsive onto said adhesive receiving channel area of a strip as defined in the preceding paragraph at least to the extent that the adhesive therein is thicker than said predetermined depth and moving said other surface of the strip into adhering contact with a substrate material.

The present invention also extends to bag manufacturing material or to bags comprising a closure strip as defined above or made in accordance with a method of manufacture which includes the method described above.

The present invention is not restricted to closure strips and substrates which are of the same material but is in fact particularly applicable to situations in which the closure strip and the substrate are of different materials and, in particular, to situations where the substrate itself is a laminate of two or more dissimilar materials.

BRIEF DESCRIPTION OF THE DRAWINGS

Further aspects, details, and characteristics of the present invention will appear from the following description of various embodiments of the invention taken in conjunction with the accompanying drawings, in which, FIGS. 1a, 1b and 1c each show various stages in three different adhesive quantity situations.

DESCRIPTION OF THE PREFERRED EMBODIMENTS

Figure 1:
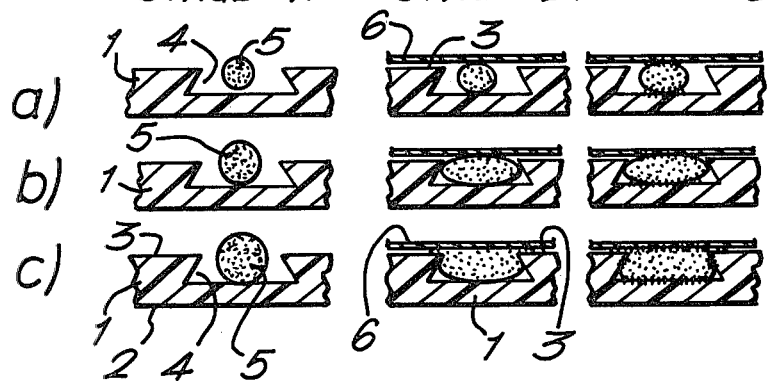

Referring now to FIG. 1 there is shown in FIGS. 1a, 1b and 1c three separate sections along a closure strip 1 which is of ribbon-like form and has one surface 2 to which a closure element in the form of a male or female profile structure is integral but is not shown in FIG. 1 and another surface 3 which includes an adhesive receiving region in the form of a channel 4. In each case a bead 5 of an adhesive or other bond forming medium is laid down in the channel 4 by an adhesive applicator system which is not shown.

Referring to FIG. 1a the bead 5 has a dimension only slightly greater than the depth of the channel 4 in the strip 1 in Stage 1 of the adhesive bonding method shown in FIG. 1a. Accordingly, when a substrate 6 is pressed against the surface 3 of the strip 1 the bead 5 is deformed only slightly and adhesive bonding takes place only in the limited regions shown in the sketch under Stage 3 of FIG. 1a. However, the thickness of the bead is assured by virtue of the configuration of the surface 3 of the closure strip so that that portion of the surface of the closure strip in contact with the bead 5 is subject to sufficient heat to ensure that the adhesive bonding takes place, as is the substrate 6.

In FIG. 1b there is shown a subsequent situation in which the bead 5 is substantially larger because of a variation in the adhesive applicator system. Accordingly, in accordance with Stage 2 there is a substantial flattening of the bead so as to fill substantially the whole cross-section of the channel 4 and bonding takes place over the substantial width of the substrate and the closure strip itself as indicated in the sketch under Stage 3 of FIG. 1b. In the case of FIG. 1c the bead laid down has a mass per unit length such that when the substrate 6 is applied as in Stage 2 of FIG. 1c some of the adhesive is actually squeezed out from the channel 4 between the substrate and the surface 3 of the closure strip 1. Because the squeezed out portion is relatively thin there is no guarantee of an adhesive bond in that region. However, there will be a secure bond because of the adhesive contained within the channel 4 which provides sufficient thermal capacity over the whole width of the channel 4 to ensure bonding.

It will be noted that pressure rollers can be set at a fairly high pressure for applying the substrate to the profile strip, where these are used, since the portion of the closure strip on either side of the channel 4 provides a substantially non-deformable spacer means element which ensures that the depth of the channel 4, and the spacing of the channel area from the substraight an adhesive layer thickness distance, is maintained during the bonding process.

It will furthermore be noted that because of the configuration of the closure strip with the provision of the channel 4, the adhesive will tend to be contained within the width confines of the closure strip and not to exude outwardly thereof so that a better quality of presentation of the final product is obtained.

FIGS. 2, 3 and 4 illustrate different embodiments of the profiled strips in accordance with the present invention.

Figure 2A:
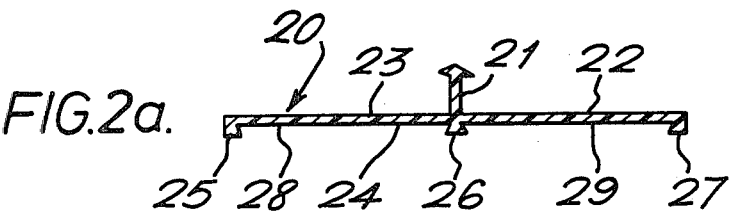
FIGS. 2a and 2b are cross-sectional views of the male and female closure strips, respectively, of one embodiment of the invention.
Figure 2B:
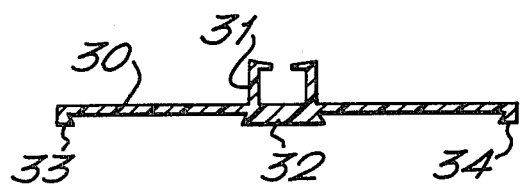

In FIG. 2, FIG. 2a shows a profile strip 20 which incorporates a male closure element 21 of generally arrowhead configuration upstanding from one surface 22 of a ribbon-like base element 22. The other surface 24 of the base element 23 is defined between three downwardly projecting spacer means ribs 25, 26, 27 which extend longitudinally of the closure strip 20. The centrally located rib 26 is positioned immediately under the male closure element 21 and the other ribs 25 and 27 are located along respective opposite longitudinal edges of the strip 20. The three ribs define a plane spaced away from and extending parallel to the surface 22 of the ribbon-like element and also define, between pairs thereof, channels 28 and 29 of an area several times as wide as the width of the ribs 25, 26, 27. The facing surfaces of the cooperating pairs of ribs defining the channels 28 and 29 are cut back or tapered so as to provide a trapezoidal cross-section of channels. FIG. 2b illustrates a cooperating female closure strip 30 which has a female closure element 31 supported by a central rib 32 having substantially the same width as the closure element 31. External ribs 33 and 34 correspond to the similar ribs on the male closure element and the closure strip 30 is otherwise similar to the closure strip 20 of FIG. 2a. The closure strips illustrated in FIG. 2 are intended to be used with twin nozzle adhesive applicator systems which provide individual beads of bonding medium for each of the two channels on the under surface of each of the strips.

Figure 3A:
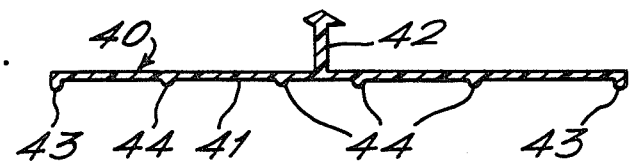
FIGS. 3a and 3b are cross-sectional views of the male and female closure strips, respectively, of another embodiment of the invention.
Figure 3B:
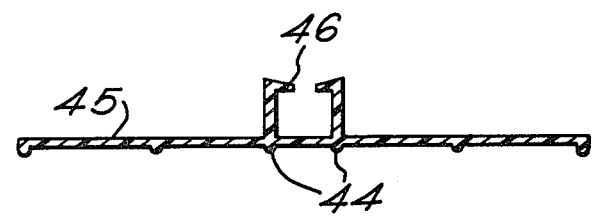

FIG. 3 illustrates a further embodiment of closure strip in accordance with the invention intended for use with a single nozzle on each adhesive applicator system for a respective closure strip. In this case the adhesive will tend to be applied as a spray rather than a bead and the thickness of the material would vary across the width of the closure strip. In particular in this case, having regard to the male closure strip 40 of FIG. 3a a plurality of longitudinally extending spacer means ridges are provided on the under surface 41 remote from the surface carrying the male closure element 42. The outside ridges 43 have a height which is approximately twice that of the inwardly lying ridges 44. This variation in height of the ridges means that the basic thickness of the adhesive bonding medium is determined by the outer ridges 43 but a minimum thickness is guaranteed by the inner ridges 44 which nevertheless allow the transfer of the adhesive bonding medium across the full width of the closure strip when pressure is applied to bond the strips together. The female closure strip 45 of FIG. 3b is constructed in the same way as the male closure strip 40 of FIG. 3a except that a female closure element 46 is provided which is supported on the innermost of the inner ribs 44.

Figure 4A:
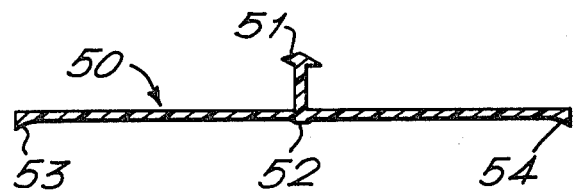
FIGS. 4a and 4b are cross-sectional views of the male and female closure strips, respectively, of still another embodiment of the invention.
Figure 4B:
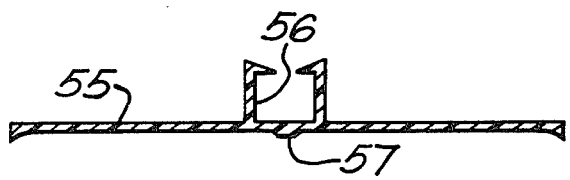

FIG. 4 shows another form of closure strip, in both the male and female constructions, intended for use with a single nozzle for applying a hot-melt adhesive. The male closure strip 50 in FIG. 4b has a male closure element 51 which is generally supported on a single longitudinally extending spacer means rib 52 which has half the height of outer spacer means ribs 53 and 54 which themselves have a rectilinear triangular formation providing a pointed contact with a substrate. The female closure element 55 of FIG. 4b has a female closure element 56 and the same rib construction as in FIG. 4a except that the innermost spacer means rib 57 has a width which is somewhat larger than the width of the rib 52 of the male closure strip 50 of FIG. 4a.

Although in the foregoing description specific reference has been made to the use of a hot melt type of adhesive, other adhesives which will provide the necessary mechanical bond, for example chemically bonding adhesives, could be used.

Figure 5:
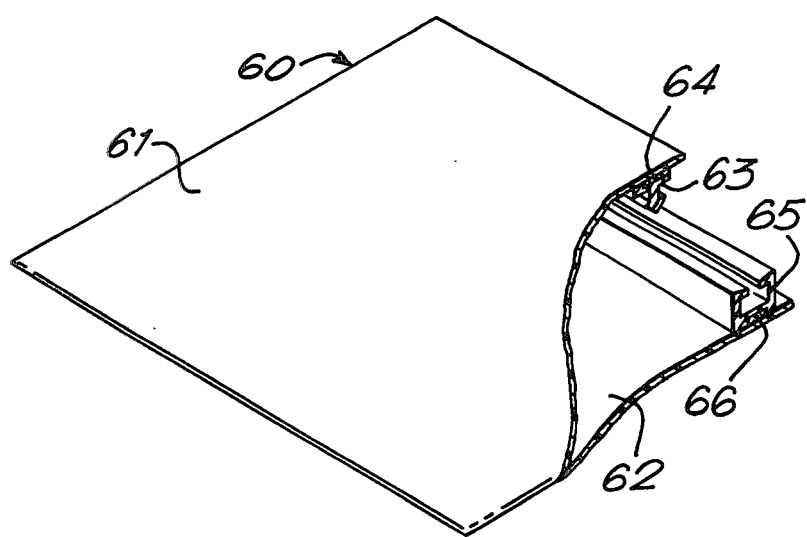
FIG. 5 is a perspective partially broken away view of an embodiment of bag constructed in accordance with the invention.

FIG. 5 illustrates in diagrammatic form a perspective view of a resealable or reclosable plastics bag incorporating a closure strip all in accordance with the invention and having one corner torn away to illustrate the location of the closure strip on the interior of a bag. The bag 60 has a pair of walls 61, 62 which are joined along their side and bottom edges by, for example, heat sealing means. A male closure strip 63 is secured to the inner surface of the wall 61 close to the opening of the bag 60 by means of adhesive 64 applied in a channel in the surface of the strip 63 which is adjacent the inner surface of the bag 61 in accordance with the invention as described above in relation to FIG. 1. Similarly a female closure strip 65 is secured to the inner surface of the wall 62 adjacent to the opening by adhesive 66 located in a channel on the face of the strip 65 adjacent to the inner surface of the wall 62 in accordance with the teachings above in relation to FIG. 1. The strips 63 and 65 are located so that on external inwardly directed pressure being applied to the top edges of the walls 61 and 62 the male arrowhead formation on the strip 63 enters the counterpart female formation on the strip 65.

I claim:

1. Material for making a reclosable bag, and including a thin sheet-like substrate material and a plastic closure strip having closure profile means projecting oppositely to a base surface having opposite longitudinal edges and adapted to be adhesively secured to the substrate, the improvement comprising:

adhesive means between said base surface and said substrate for securing said base surface to the substrate;

and spacer means along said edges extending between said base surface and said substrate, said spacer means being separated by a longitudinal area of said base surface located between said spacer means, said base surface having many times the width of said spacer means, and said base surface being inset relative to said spacer means for assuring a substantial thickness of the adhesive between said base surface and said substrate.

2. In a closure strip of plastics material for use in the manufacture of a resealable bag and having a longitudinally extending profiled closure element upstanding with respect to one face of a ribbon-like base element and having an opposite face surface adapted to be adhesively attached to bag material, the improvement in which said opposite face surface of the ribbon-like base element includes adhesive-confining narrow spacer rib means along opposite longitudinal edges and projecting from said surface a distance about the same as the thickness of a layer of adhesive for securing the closure strip to a substrate of said bag material, there being an adhesive layer-receiving wide channel area of said surface several times as wide as said rib means and intervening between said rib means; said rib means being adapted to maintain said area spaced an adhesive layer thickness distance from the substrate when pressure is applied for pressing the strip and substrate together.

3. A closure strip according to claim 1 or 2, including additional narrow spacer rib means on said area but projecting from said area less than said edge rib means.

4. A closure strip according to claim 2 wherein said rib means are pointed.

5. A closure strip according to claim 2, wherein a portion of said channel area underlies said closure element.

6. A closure strip according to claim 2, wherein a similar spacer rib means spaced laterally from said narrow spacer rib means underlies said closure element.

7. A closure strip according to claim 2 4 or claim 6 wherein said rib means are rounded.

8. A closure strip according to claim 2, wherein said rib means have sides which extend from the channel area and are tapered towards each other.

9. A closure strip according to claim 2 or claim 3 or claim 8 wherein said rib means are flat.

10. A closure strip according to any one of claims 2, 8 or 11 comprising a plurality of said channel areas extending parallel to each other and divided by additional rib means.

11. A closure strip according to claim 2, wherein said rib means have sides which extend from the channel area and are tapered away from each other.

12. A method of making material for producing reclosable bags, and including providing a thin sheet-like substrate material and a plastic closure strip having profile means projecting oppositely to a base surface having opposite longitudinal edges and adapted to be adhesively secured to the substrate, the improvement comprising:

applying adhesive means between said base surface and said substrate and securing said base surface to the substrate;

and providing spacer means along said edges extending between said base surface and said substrate and separating the spacer means by a longitudinal area of said base surface located between said spacer means, said base surface being of many times the width of said spacer means and being inset relative to said spacer means, and thereby assuring a substantial thickness of the adhesive between surface and said substrate.

13. A method according to claim 12, comprising applying said adhesive in a strip thicker than the extent to which said longitudinal area is inset relative to said spacer means, said adhesive strip being narrower than said area, and flattening the adhesive strip by pressing said closure strip and said substrate together.

14. A method according to claim 13, comprising applying said adhesive as a hot melt adhesive.

15. A method according to claim 13 or claim 14 comprising applying said substrate material in a laminate of two or more dissimilar materials.

* * * * *

UNITED STATES PATENT AND TRADEMARK OFFICE
CERTIFICATE OF CORRECTION

PATENT NO. : 4,354,541

DATED : October 19, 1982

INVENTOR(S) : Paul Arthur Tilman

It is certified that error appears in the above—identified patent and that said Letters Patent is hereby corrected as shown below:

On the title page, under item [30] Foreign Application Priority Data, change the foreign application number from "7927390" to --7931823--.

Signed and Sealed this

Twenty-sixth Day of July 1983.

[SEAL]

Attest:

GERALD J. MOSSINGHOFF

Attesting Officer

Commissioner of Patents and Trademarks